(12) United States Patent
Ferrés et al.

(10) Patent No.: US 12,524,847 B2
(45) Date of Patent: *Jan. 13, 2026

(54) METHOD AND APPARATUS FOR CONVOLUTIONAL NEURAL NETWORK-BASED VIDEO DENOISING

(71) Applicant: GoPro, Inc., San Mateo, CA (US)

(72) Inventors: Matias Tassano Ferrés, Paris (FR); Thomas Nicolas Emmanuel Veit, Meudon (FR); Julie Delon, Paris (FR)

(73) Assignee: GoPro, Inc., San Mateo, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 18/435,359

(22) Filed: Feb. 7, 2024

(65) Prior Publication Data

US 2024/0177275 A1    May 30, 2024

Related U.S. Application Data

(63) Continuation of application No. 16/912,395, filed on Jun. 25, 2020, now Pat. No. 11,900,566.
(Continued)

(51) Int. Cl.
*G06T 5/70* (2024.01)
*G06N 3/08* (2023.01)
*G06T 5/50* (2006.01)

(52) U.S. Cl.
CPC .............. *G06T 5/70* (2024.01); *G06N 3/08* (2013.01); *G06T 5/50* (2013.01);
(Continued)

(58) Field of Classification Search
None
See application file for complete search history.

(56) References Cited

U.S. PATENT DOCUMENTS 9,897,415 B2    2/2018 Zhang
11,900,566 B1*  2/2024 Ferr?s .................. G06T 5/70
(Continued)

OTHER PUBLICATIONS

A. Buades and J. Lisani, "Enhancement of Noisy and Compressed Videos by Optical Flow and Non-Local Denoising," in IEEE Transactions on Circuits and Systems for Video Technology, vol. 30, No. 7, pp. 1960-1974, Jul. 2020, doi: 10.1109/TCSVT .2019. 2911877. (Year: 2020).
(Continued)

*Primary Examiner* — Leon Viet Q Nguyen
(74) *Attorney, Agent, or Firm* — Young Basile Hanlon & MacFarlane, P.C.

(57) ABSTRACT

An image capture device includes an image sensor and a processor. The image sensor is configured to capture a first plurality of frames, a second plurality of frames, and a third plurality of frames. The processor includes a first denoising layer and a second denoising layer. The first denoising layer includes a first denoiser, a second denoiser, and a third denoiser. The first denoiser is configured to denoise the first plurality of frames and output a first denoised frame. The second denoiser is configured to denoise the second plurality of frames and output a second denoised frame. The third denoiser is configured to denoise the third plurality of frames and output a third denoised frame. The second denoising layer includes a fourth denoiser. The fourth denoiser is configured to output a denoised frame based on the first denoised frame, the second denoised frame, and the third denoised frame.

20 Claims, 9 Drawing Sheets

Related U.S. Application Data

(60) Provisional application No. 62/866,885, filed on Jun. 26, 2019.

(52) U.S. Cl.
CPC .............. *G06T 2207/10016* (2013.01); *G06T 2207/20081* (2013.01); *G06T 2207/20084* (2013.01)

(56) References Cited

U.S. PATENT DOCUMENTS

| | | | |
|---|---|---|---|
| 2006/0114994 A1 | 6/2006 | Silverstein | |
| 2014/0125869 A1 | 5/2014 | Schoenblum | |
| 2015/0262336 A1 | 9/2015 | Jin | |
| 2017/0084007 A1 | 3/2017 | Rakhshanfar | |
| 2017/0374363 A1 | 12/2017 | Deng | |
| 2018/0343448 A1 | 11/2018 | Possos | |
| 2019/0272440 A1* | 9/2019 | Nilsson | G06T 5/70 |
| 2019/0304067 A1 | 10/2019 | Vogels | |
| 2019/0304069 A1* | 10/2019 | Vogels | G06N 20/00 |
| 2020/0126191 A1* | 4/2020 | Munkberg | G06T 5/70 |
| 2020/0156074 A1 | 5/2020 | Tao | |
| 2020/0279354 A1* | 9/2020 | Klaiman | G06N 20/00 |

OTHER PUBLICATIONS

Alex Krizhevsky, Ilya Sutskever, and Geoffrey E Hinton, "ImageNet Classification with Deep Convolutional Neural Networks," NIPS, pp. 1-9, 2012.
Antoni Buades and Jose-Luis Lisani, "Patch-Based Video Denoising With Optical Flow Estimation," IEEE Trans. IP, vol. 25, No. 6, pp. 2573-2586, 2016.
Bertalmio, "Denoising of Photographic Images and Video", Springer, 2018, ISBN 978-3-319-96028-9, https://doi.org/10.1007/978-3-319-96029-6, 339 pages.
Chen et al., "Learning to See in the Dark", arXiv:1805.01934v1 (cs.CV) May 4, 2018, 10 pages.
Claus, Michele, and Jan van Gemert. "Videnn: Deep blind video denoising." In Proceedings of the IEEE/CVF Conference on Computer Vision and Pattern Recognition Workshops. 2019. (Year: 2019) 10 pages.
D.P. Kingma and J.L. Ba, "Adam: A Method for Stochastic Optimization," Proc. ICLR, pp. 1-15, 2015.
Davy et al., "Non-Local Video Denoising by CNN", arXiv:1811.12758v2 (cs.CV) Jul. 2, 2019, 14 pages.
Dewil, Valery, Jeremy Anger, Axel Davy, Thibaud Ehret, Gabriele Facciolo, and Pablo Arias. "Self-supervised training for blind multiframe video denoising." In Proceedings of the IEEE/CVF winter conference on applications of computer vision, pp. 2724-2734. 2021. (Year: 2021).
Dosovitskiy et al., "FlowNet: Learning Optical Flow with Convolutional Networks", CVF, pp. 2758-2766, 2015.
H.C. Burger, C.J. Schuler, and S. Harmeling, "Image denoising: Can plain neural networks compete with BM3D?," 2012, pp. 2392-2399.
He et al., "Deep Residual Learning for Image Recognition", arXiv:1512.03385v1 (cs.CV) Dec. 10, 2015, 12 pages.
K Dabov, A Foi, and V Katkovnik, "Image denoising by sparse 3D transformation-domain collaborative filtering," IEEE Trans. IP, vol. 16, No. 8, pp. 1-16, 2007.
K. Zhang, W. Zuo, and L. Zhang, "FFDNet: Toward a Fast and Flexible Solution for CNN based Image Denoising," IEEE Trans. IP, vol. 27, No. 9, pp. 4608-4622, 2018.
K. Zhang, W. Zuo, Y. Chen, D. Meng, and L. Zhang, "Beyond a Gaussian denoiser: Residual learning of deep CNN for image denoising," IEEE Trans. IP, vol. 26, No. 7, pp. 3142-3155, 2017.
Liu et al., "A High-Quality Video Denoising Algorithm Based on Reliable Motion Estimation", ECCV 2010, Part III, LNCS 6313, pp. 706-719, 2010.
Liu et al., "Multi-level Wavelet-CNN for Image Restoration", CVF, pp. 886-895. 2018.

M. C. Sheeba and D. C. Seldev Christopher, "A Review On Video Denoising Methods," 2019 International Conference on Recent Advances in Energy-efficient Computing and Communication (ICRAECC), Mar. 2019, pp. 1-6, doi: 10.1109/ICRAECC43874.2019.8995148. (Year: 2019).
M. Gharbi, G. Chaurasia, S. Paris, and F. Durand, "Deep joint demosaicking and denoising," ACM Trans. Graphics, vol. 35, No. 6, pp. 1-12, 2016.
M. Lebrun, A. Buades, and J. M. Morel, "A Nonlocal Bayesian Image Denoising Algorithm," SIAM Journal IS, vol. 6, No. 3, pp. 1665-1688, 2013.
Matias Tassano, Julie Delon, and Thomas Veit, "An Analysis and Implementation of the FFDNet Image Denoising Method," IPOL, vol. 9, pp. 1-25, 2019.
Matteo Maggioni, Giacomo Boracchi, Alessandro Foi, and Karen Egiazarian, "Video denoising, deblocking, and enhancement through separable 4-D nonlocal spatiotemporal transforms," IEEE Trans. IP, vol. 21, No. 9, pp. 3952-3966, 2012.
Pablo Arias and Jean-Michel Morel, "Video denoising via empirical Bayesian estimation of space-time patches," Journal of Mathematical Imaging and Vision, vol. 60, No. 1, pp. 70-93, 2018.
Paszke et al., "Automatic differentiation in PyTorch", 31 st Conference on NIPS 2017, Long Beach, CA, USA, 4 pages.
R. Almahdi and R. C. Hardie, "Recursive non-local means filter for video denoising with Poisson-Gaussian noise," 2016 IEEE National Aerospace and Electronics Conference (NAECON) and Ohio Innovation Summit (OIS), 2016, pp. 318-322, doi: 10.1109/ NAECON.2016.7856822. (Year: 2016).
Razvan Pascanu, Tomas Mikolov, and Yoshua Bengio, "On the difficulty of training recurrent neural networks," in ICML, 2013, pp. 1310-1318.
Ronneberger et al., "U-Net: Convolutional Networks for Biomedical Image Segmentation", http://lmb.informatik.uni-freiburg.de/, arXiv:1505.04597v1 (cs.CV) May 18, 2015, 8 pages.
Schwartz et al., "DeepISP: Towards Learning an End-to-End Image Processing Pipeline", arXiv:1801.06724v2 (eess.IV) Feb. 3, 2019, 12 pages.
Sergey Ioffe and Christian Szegedy, "Batch Normalization: Accelerating Deep Network Training by Reducing Internal Covariate Shift," in Proc. ICML. 2015, pp. 448-456, JMLR.org.
Seshadrinathan et al., "Motion Tuned Spatio-temporal Quality Assessment of Natural Videos", IEEE TTransactions on Image Processing, pp. 1-16, 2009.
Shi et al., "Real-Time Single Image and Video Super-Resolution Using an Efficient Sub-Pixel Convolutional Neural Network", CVF, pp. 1874-1883. 2016.
Tassano et al., "DVDNet: A Fast Network for Deep Video Denoising", arXiv:1906.11890v1 (eess.IV) Jun. 4, 2019, 6 pages.
Tassano, Matias, Julie Delon, and Thomas Veit. "Dvdnet: A fast network for deep video denoising." In 2019 IEEE International Conference on Image Processing (ICIP), pp. 1805-1809. IEEE, 2019. (Year: 2019).
Tassano, Matias, Julie Delon, and Thomas Veit. "Fastdvdnet: Towards real-time deep video denoising without flow estimation." In Proceedings of the IEEE/CVF Conference on Computer Vision and Pattern Recognition, pp. 1354-1363. 2020. (Year: 2020).
Thijs Vogels, Fabrice Rousselle, Brian McWilliams, Gerhard R"othlin, Alex Harvill, David Adler, Mark Meyer, and Jan Nov'ak, "Denoising with kernel prediction and asymmetric loss functions," ACM Trans. Graphics, vol. 37, No. 4, pp. 124, 2018.
U. Schmidt and S. Roth, "Shrinkage fields for effective image restoration," 2014, pp. 2774-2781.
V. Santhanam, V.I. Morariu, and L.S. Davis, "Generalized Deep Image to Image Regression," in Proc. CVPR, 2016, 11 pages.
Wu et al., "Deep High Dynamic Range Imaging with Large Foregound Motions", CVF, 16 pages. 2018.
Xinyuan Chen, Li Song, and Xiaokang Yang, "Deep rnns for video denoising," in Applications of Digital Image Processing XXXIX. International Society for Optics and Photonics, 2016, vol. 9971, p. 99711T. 10 pages.

(56) References Cited

OTHER PUBLICATIONS

Y. Chen and T. Pock, "Trainable Nonlinear Reaction Diffusion: A Flexible Framework for Fast and Effective Image Restoration," IEEE Trans. PAMI, vol. 39, No. 6, pp. 1256-1272, 2017.

* cited by examiner

METHOD AND APPARATUS FOR CONVOLUTIONAL NEURAL NETWORK-BASED VIDEO DENOISING

CROSS-REFERENCE TO RELATED APPLICATION(S)

This application is a continuation of U.S. patent application Ser. No. 16/912,395, filed Jun. 25, 2020, which claims priority to U.S. Patent Application No. 62/866,885, filed Jun. 26, 2019, the entire disclosures of which are hereby incorporated by reference.

TECHNICAL FIELD

This disclosure relates to image and video denoising.

BACKGROUND

Compared to image denoising, video denoising appears as a largely underexplored domain. Typical image denoising methods based on deep learning techniques require many hand-tuned parameters in the training process, and a specific model must be trained for each noise level. These methods require large computing times and have a large memory footprint, and are therefore impractical for use in video denoising. It would therefore be desirable to have a video denoising method based on deep learning techniques that do not require large computing times and large memory requirements.

SUMMARY

Disclosed herein are implementations of convolutional neural network-based video denoising. An aspect may include a method for denoising a video. The video may include multiple frames. The method may include obtaining, at a first denoiser, a central frame, an input frame that is temporally precedent to the central frame, a second input frame that is temporally precedent to the input frame, or any combination thereof. The method may include obtaining, at a second denoiser, the central frame, the input frame, a third input frame that is temporally subsequent to the central frame, or any combination thereof. The method may include obtaining, at a third denoiser, the central frame, the third input frame, a fourth input frame that is temporally subsequent to the third input frame, or any combination thereof. The method may include obtaining, at a fourth denoiser, a first denoised frame from the first denoiser, a second denoised frame from the second denoiser, a third denoised frame from the third denoiser, or any combination thereof. The method may include denoising the first denoised frame, the second denoised frame, the third denoised frame, or any combination thereof. The method may include outputting a fourth denoised frame based on the first denoised frame, the second denoised frame, the third denoised frame, or any combination thereof.

Another aspect may include an image capture device. The image capture device may include an image sensor, a first denoiser, a second denoiser, a third denoiser, a fourth denoiser, or any combination thereof. The image sensor may be configured to capture a central frame, an input frame that is temporally precedent to the central frame, a second input frame that is temporally precedent to the input frame, a third input frame that is temporally subsequent to the central frame, a fourth input frame that is temporally subsequent to the third input frame, or any combination thereof. The first denoiser may be configured to denoise the central frame, the input frame, the second input frame, or any combination thereof. The first denoiser may be configured to output a first denoised frame. The second denoiser may be configured to denoise the central frame, the input frame, the third input frame, or any combination thereof. The second denoiser may be configured to output a second denoised frame. The third denoiser may be configured to denoise the central frame, the third input frame, the fourth input frame, or any combination thereof. The third denoiser may be configured to output a third denoised frame. The fourth denoiser may be configured to denoise the first denoised frame, the second denoised frame, the third denoised frame, or any combination thereof. The fourth denoiser may be configured to output a fourth denoised frame.

Another aspect may include an image capture device. The image capture device may include an image sensor and a processor. The image sensor may be configured to capture a first plurality of frames, a second plurality of frames, a third plurality of frames, or any combination thereof. The processor may include a first denoising layer, a second denoising layer, or both. The first denoising layer may include a first denoiser, a second denoiser, a third denoiser, or any combination thereof. The first denoiser may be configured to denoise the first plurality of frames. The first denoiser may be configured to output a first denoised frame. The second denoiser may be configured to denoise the second plurality of frames. The second denoiser may be configured to output a second denoised frame. The third denoiser may be configured to denoise the third plurality of frames. The third denoiser may be configured to output a third denoised frame. The second denoising layer may include a fourth denoiser. The fourth denoiser may be configured to output a denoised frame based on the first denoised frame, the second denoised frame, the third denoised frame, or any combination thereof.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

The implementations disclosed herein employ deep learning approaches to video denoising. The examples described herein refer to the addition of additive white Gaussian noise (AWGN). It is understood that the implementations disclosed herein may be extended to other types of noise, for example, spatially varying noise (e.g., Poissonian noise). For the examples disclosed herein, let I be a noiseless image, while $\tilde{I}$ is its noisy version corrupted by a realization of zero-mean white Gaussian noise N of standard deviation σ, then $$\tilde{I} = I + N. \quad (1)$$

Figure 1A:
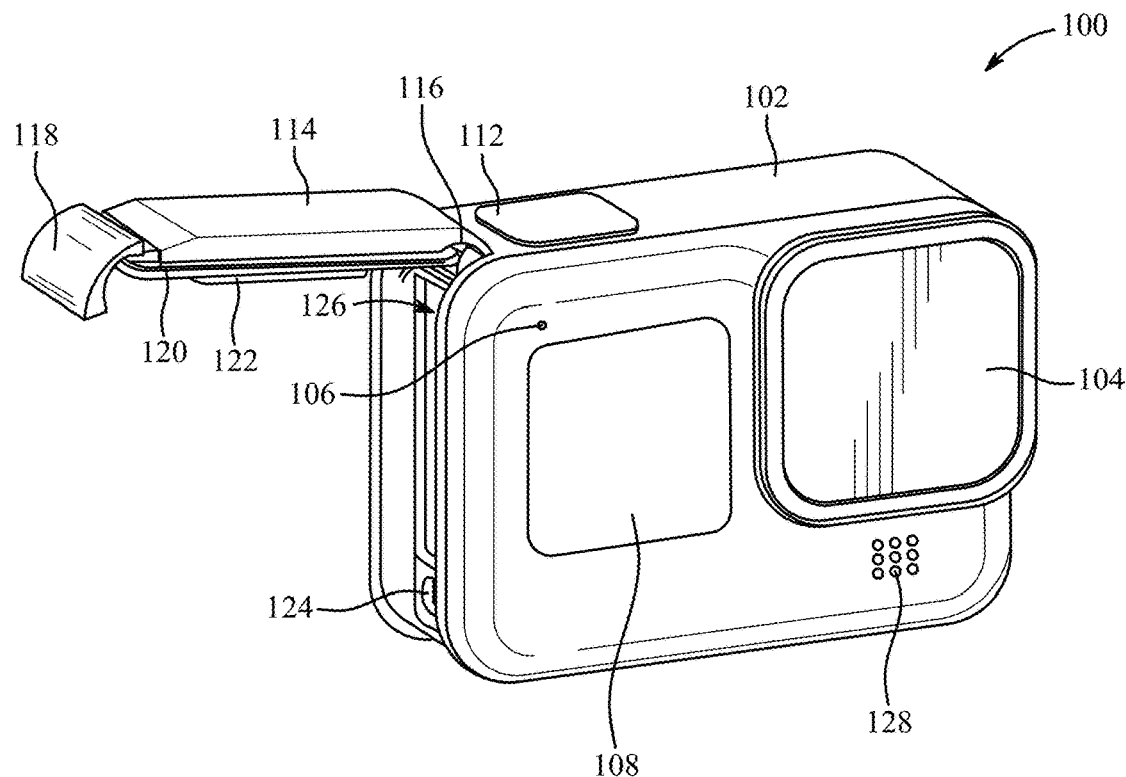
FIGS. 1A-B are isometric views of an example of an image capture device.
Figure 1B:
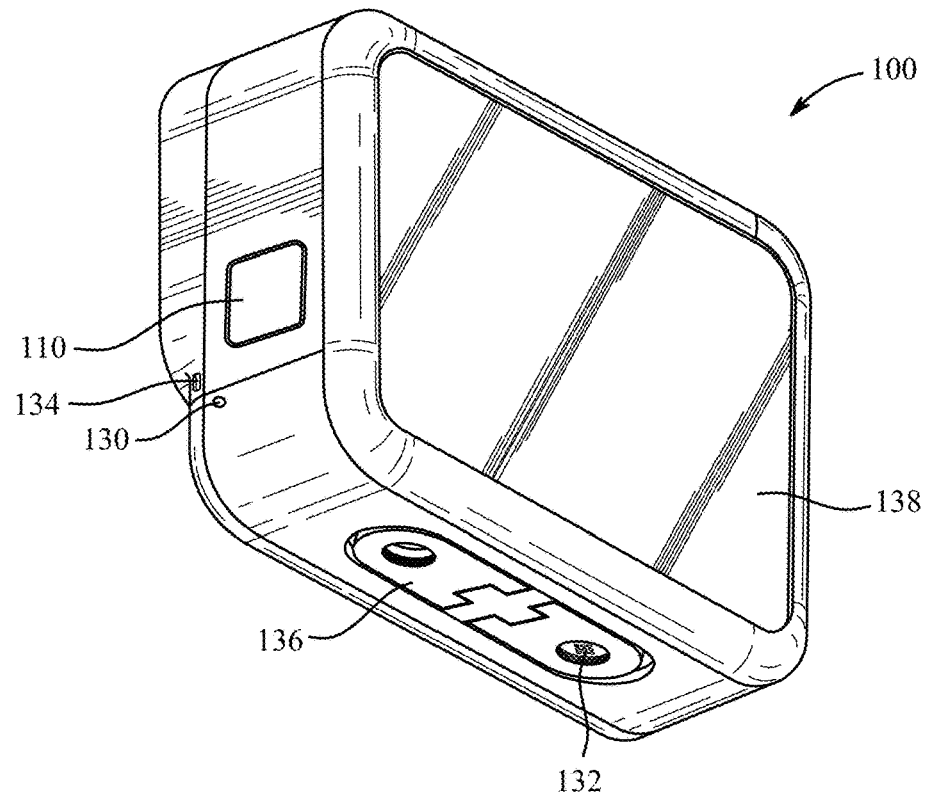

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 7:
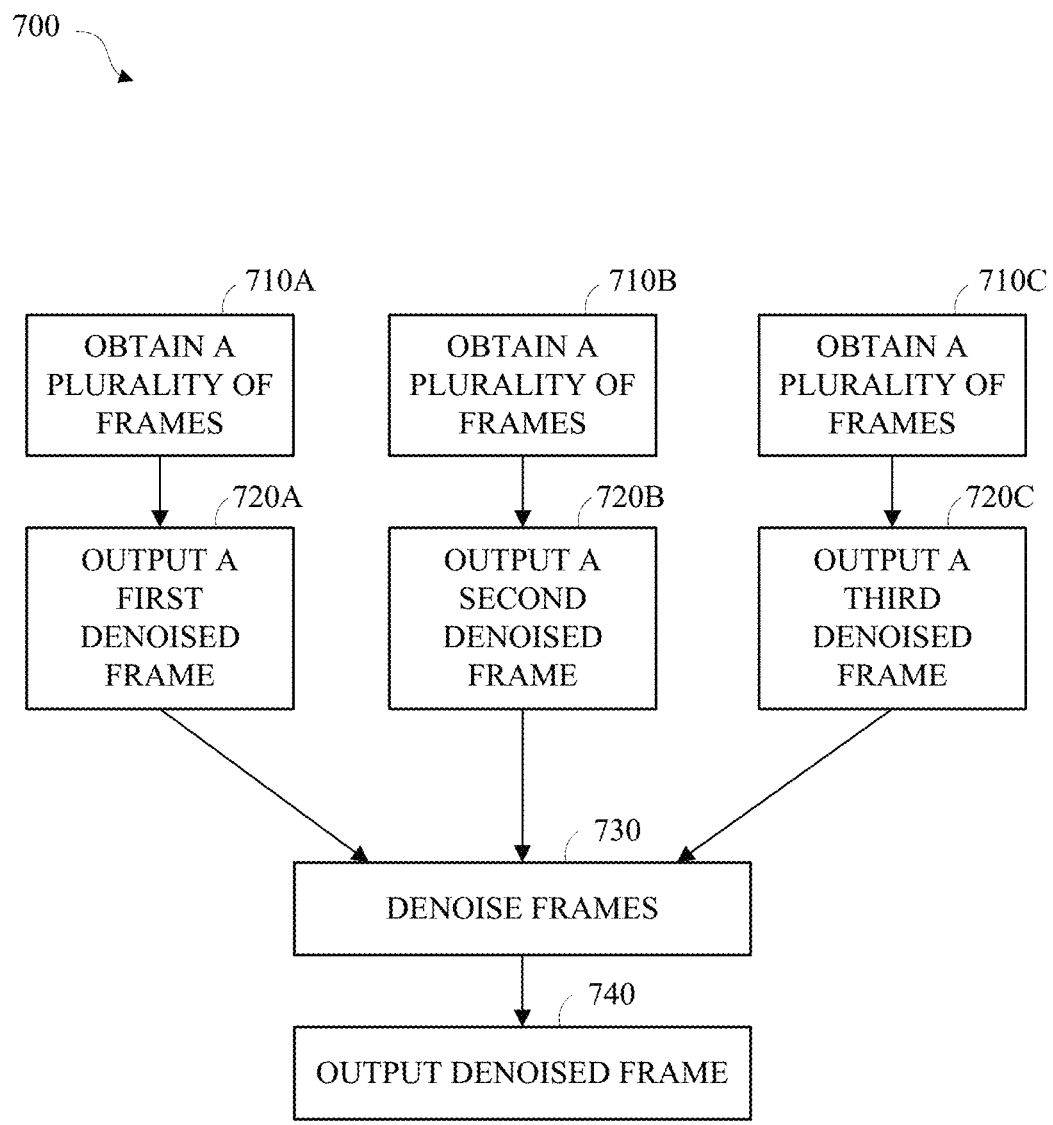
FIG. 7 is a flow diagram of an example of a convolutional neural network video denoising method.

The image capture device 100 may be used to implement some or all of the techniques described in this disclosure, such as the technique 700 described in FIG. 7.

Figure 2A:
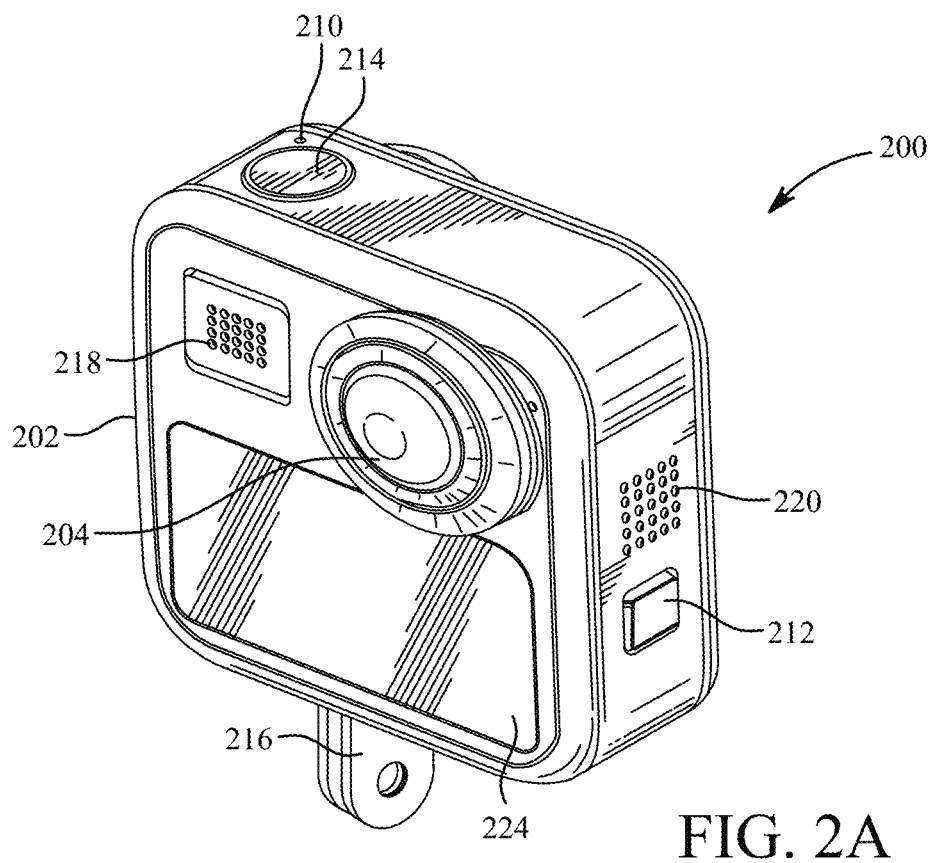
FIGS. 2A-B are isometric views of another example of an image capture device.
Figure 2B:
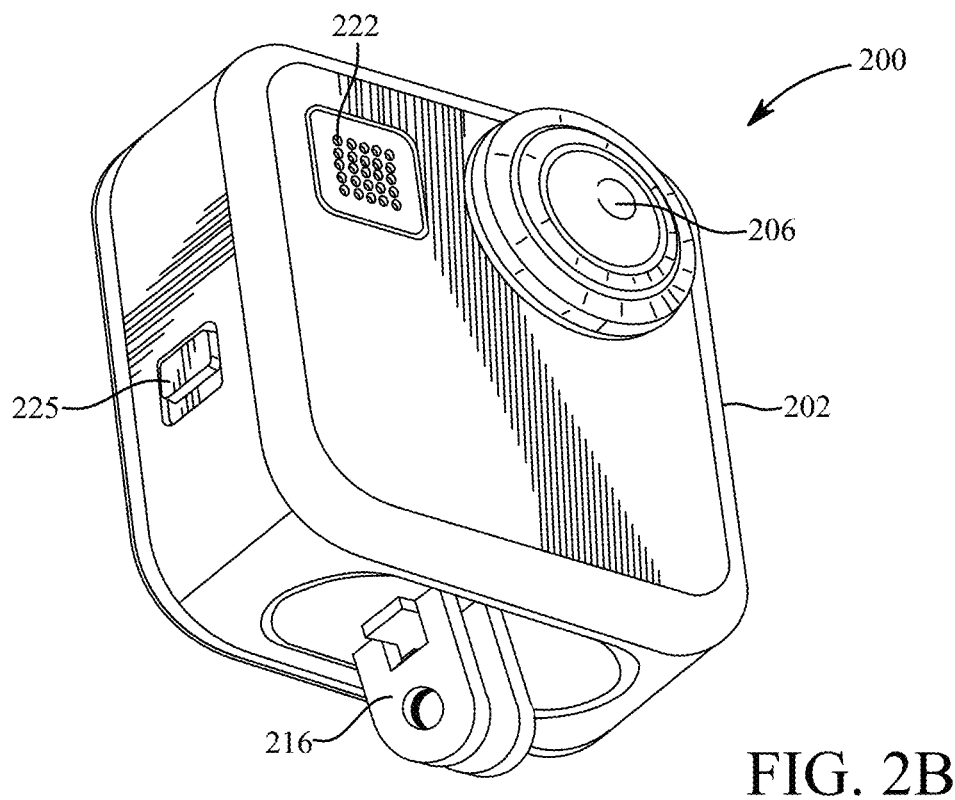

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
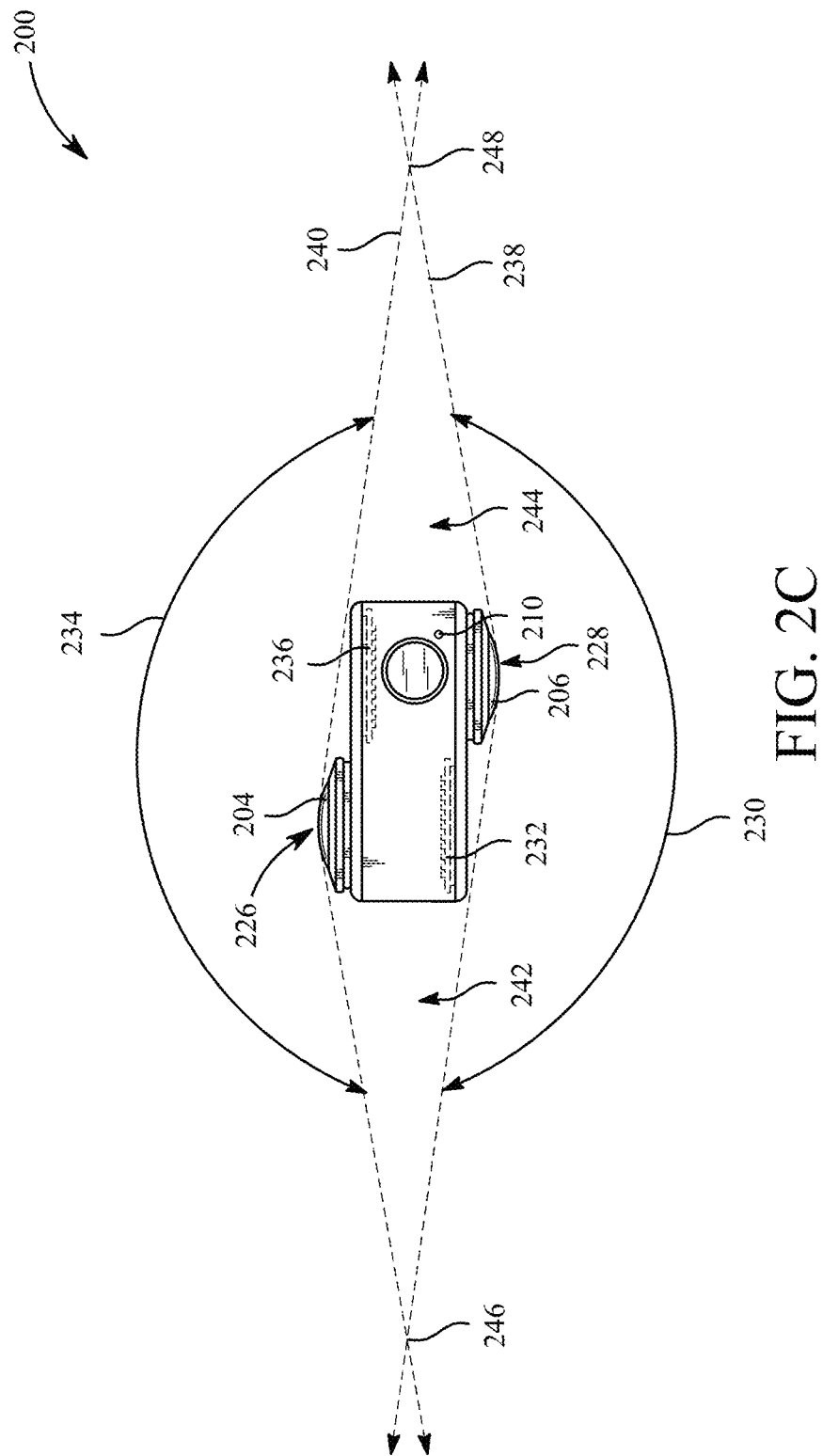
FIG. 2C is a top view of the image capture device of FIGS. 2A-B.
Figure 2D:
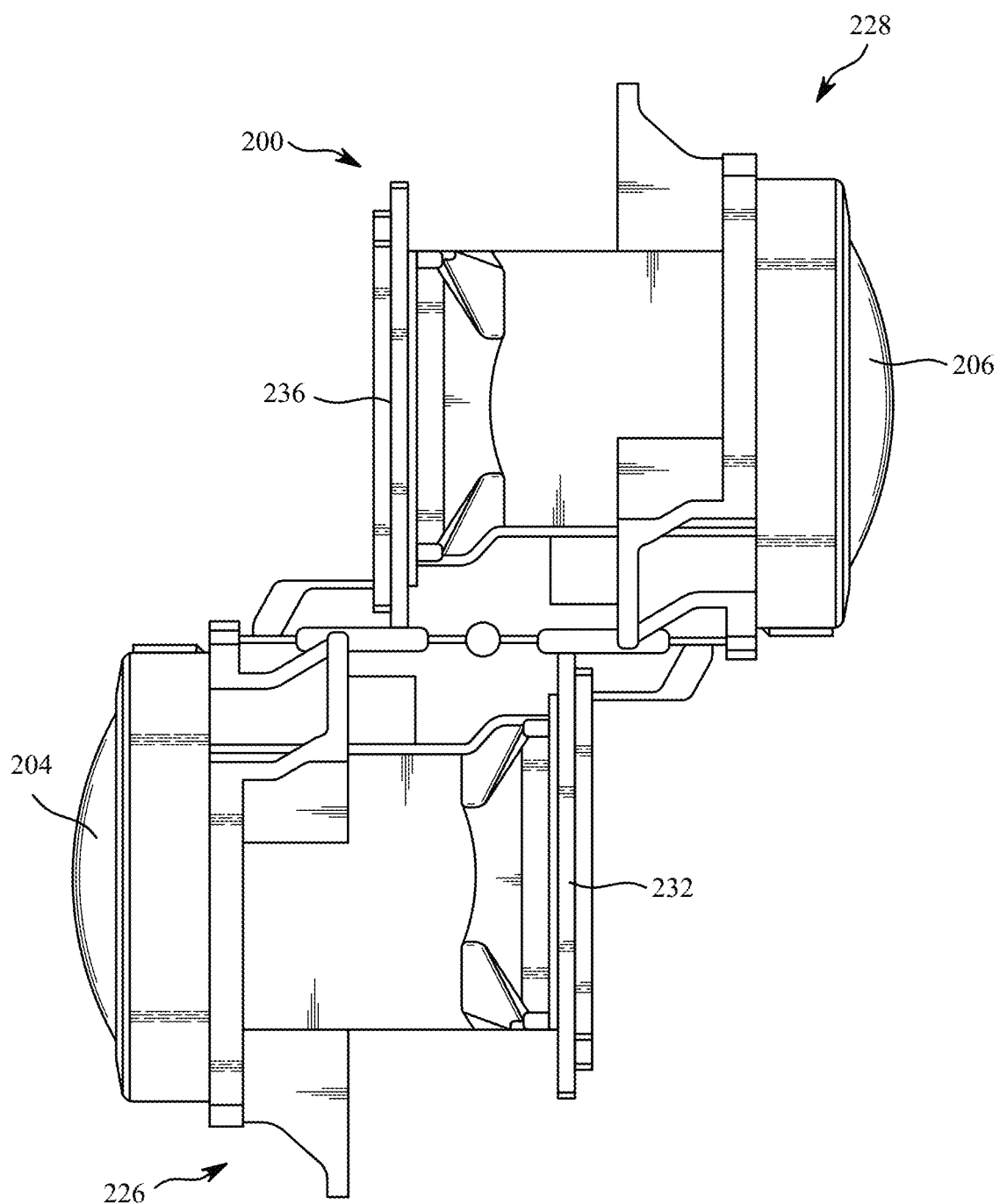
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the techniques described in this disclosure, such as the technique 700 described in FIG. 7.

Figure 3:
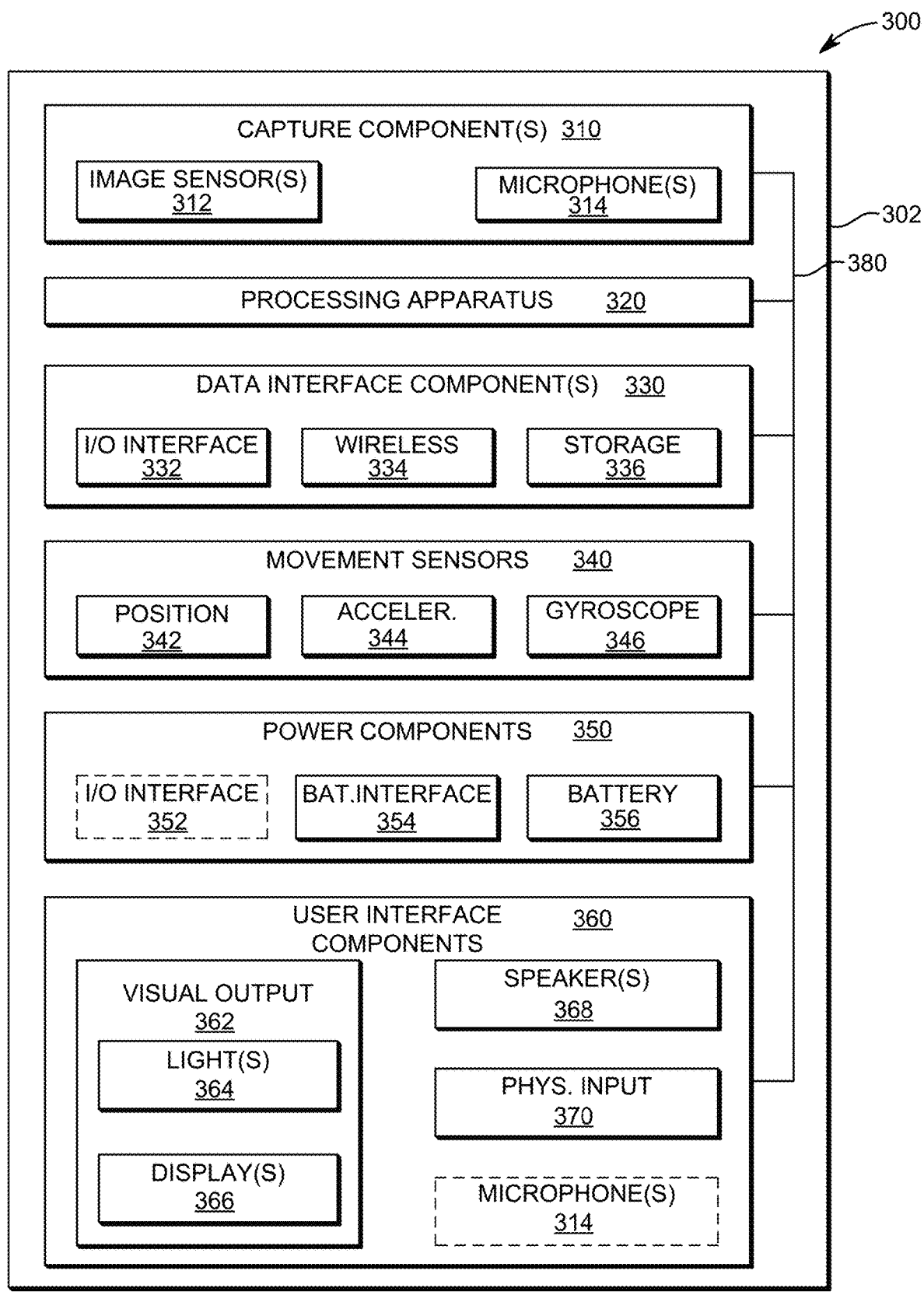
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include the I/O interface 332, as indicated in dotted line, and the power components 350 may receive power from an external source, such as a wall plug or external battery, for operating the image capture device 300 and/or charging the battery 354 of the image capture device 300.

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the technique 700 described in FIG. 7.

Figure 4:
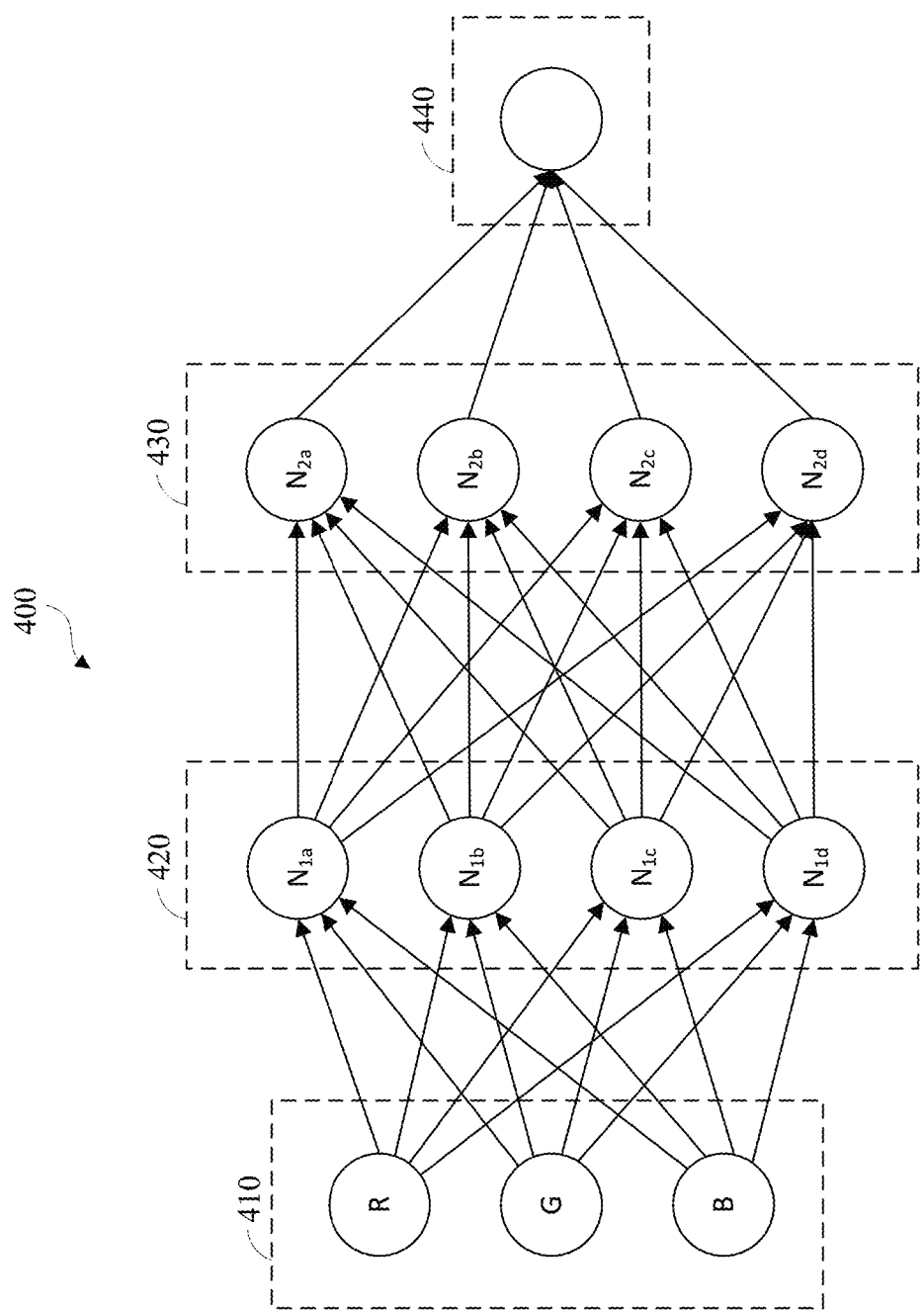
FIG. 4 is a block diagram of an example of a convolutional neural network.

FIG. 4 is a block diagram of an example of a convolutional neural network 400 in accordance with embodiments of this disclosure. As shown in FIG. 4, the convolutional neural network 400 includes an input layer 410, a first hidden layer 420, a second hidden layer 430, and an output layer 440. The example convolutional neural network 400 may include any number of hidden layers, and two hidden layers are shown merely as an example for simplicity and clarity.

The input layer 410 may hold the raw pixel values of an image arranged in three dimensions. The three dimensions may include a width, a height, and a depth. The depth may refer to an activation volume. The input images are an input volume of activations, and the volume has dimensions of width, height, and depth. For example, the input layer 410 may include raw pixel values associated with an image width in pixels, an image height in pixels, and with three color channels, red (R), green (G), and blue (B).

The first hidden layer 420 and the second hidden layer 430 each include a set of neurons, where each neuron is fully connected to all the neurons in the previous layer. For example, neuron $N_{2b}$ of the second hidden layer 430 is connected to neuron $N_{1a}$, neuron $N_{1b}$, neuron $N_{1c}$, and neuron $N_{1d}$ of the first hidden layer 420. The neurons of the first hidden layer 420 and the second hidden layer 430 are arranged in three dimensions having a width, a height, and a depth. The depth refers to the third dimension of an activation volume, and may refer to the total number of layers in a network. In some embodiments, the neurons in a layer may only be connected to a small region of the layer before it, rather than in a fully-connected manner.

The first hidden layer 420 and the second hidden layer 430 each perform transformations that are a function of the activations and of the parameters (i.e., the weights and biases of the neurons). The first hidden layer 420 receives an input at each neuron from each channel of the input layer 410. Each neuron of the first hidden layer 420 transforms the input from each channel. The second hidden layer 430 receives the transformed input at each neuron from each neuron from the first hidden layer 420. Each neuron of the second hidden layer 430 transforms the transformed input from each neuron of the first hidden layer 420. In some examples, the first hidden layer 420, the second hidden layer 430, or both, may include a convolutional layer, a rectified linear unit (ReLU) activation layer, a normalization layer, or any combination thereof in any order. The convolutional layer may be configured to compute the output of neurons that are connected to local regions in the input, each neuron computing a dot product between their weights and a small region to which they are connected in the input volume. The ReLU activation layer may apply an elementwise activation function, for example, the max(x, 0) thresholding at zero. The normalization layer may be used to normalize the input layer by adjusting and scaling the output of the previous activation layer.

The output layer 440 may be referred to as a fully-connected layer. The output layer 440 is configured to perform transformations that are a function of the activations and of the parameters (i.e., the weights and biases of the neurons). The output layer 440 may be configured to compute a score, for example, a classification score to categorize an image.

Temporal coherence and the lack of flickering are crucial aspects in the perceived quality of the results for video denoising algorithms. In order to achieve these, an algorithm must make use of the temporal information existent in the temporal neighbors when denoising a frame of an image sequence. In general, most previous approaches based on deep learning have failed to employ this temporal information effectively. Typical algorithms rely mainly on two factors to enforce temporal coherence in the results, for example, the extension of search regions from spatial neighborhoods to volumetric neighborhoods, and the use of motion estimation.

The use of volumetric, or spatio-temporal, neighborhoods implies that when denoising a pixel or patch, the algorithm may identify similar pixels (i.e., patches) not only in the reference frame, but also in adjacent frames of the sequence. The benefits of this are two-fold. First, the temporal neighbors provide additional information that may be used to denoise the reference frame. Second, using temporal neighbors may reduce flickering as the residual error in each frame will be correlated.

Video data typically features a strong temporal redundancy along motion trajectories. This temporal redundancy may facilitate denoising videos with respect to denoising images. Yet, this added information in the temporal dimension also creates an extra degree of complexity which could be difficult to tackle. In this context, motion estimation, motion compensation, or both have been employed in a number of video denoising algorithms to help to improve denoising performance and temporal consistency.

The embodiments disclosed herein incorporate these two elements into the architecture. However, in some embodiments, the architecture may not include an explicit motion estimation stage, motion compensation stage, or both. The capacity of handling the motion of objects may be embedded into the architecture. The architecture may be composed of a number of modified U-Net blocks. Multi-scale, U-Net-like architectures may have the ability to learn misalignment. A cascaded architecture may be employed to increase this capacity of handling movement even further. The architecture described in the embodiments disclosed herein may be trained end-to-end without optical flow alignment, which avoids distortions and artifacts due to erroneous flow. As a result, a dedicated motion compensation stage may be eliminated without sacrificing performance. This leads to a reduction of runtimes. The embodiments disclosed herein may run one to three orders of magnitude or more faster than typical architectures.

Figure 5:
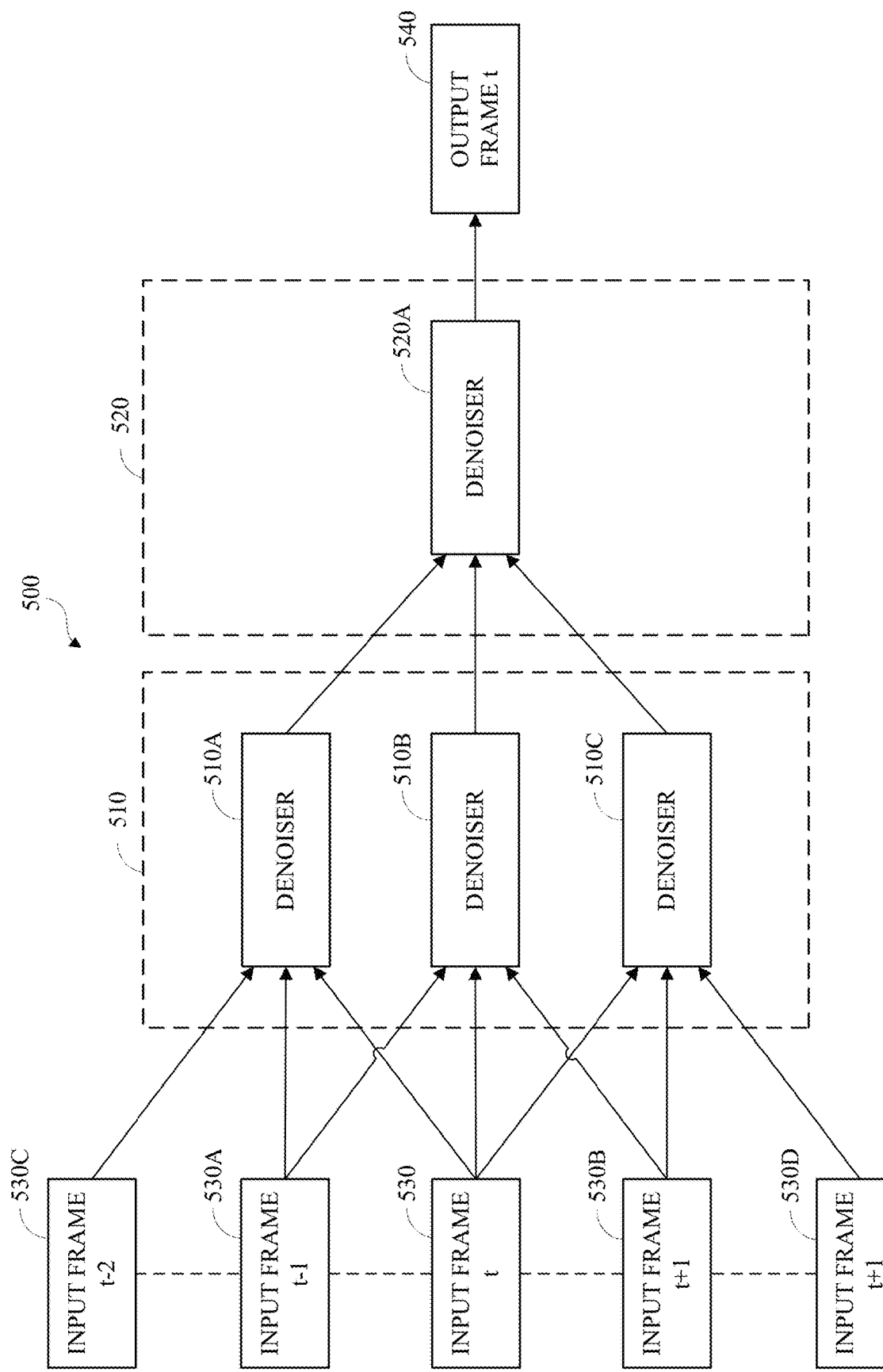
FIG. 5 is a block diagram of an example of a convolutional neural network video denoising architecture.

FIG. 5 is a block diagram of an example of a convolutional neural network video denoising architecture 500. When denoising a given frame at time t, $\tilde{I}_t$, its 2T=4 neighboring frames are also taken as inputs. That is, the inputs of the algorithms will be $\{\tilde{I}_{t-2}, \tilde{I}_{t-1}, \tilde{I}_t, \tilde{I}_{t+1}, \tilde{I}_{t+2}\}$. The architecture 500 may include one or more denoising layers, for example denoising layer 510 and denoising layer 520. As shown in FIG. 5, the architecture 500 is composed of denoiser 510A, denoiser 510B, denoiser 510C, and denoiser 520A, assembled in a cascaded two-step architecture. One or more of denoiser 510A, denoiser 510B, denoiser 510C, and denoiser 520A may be a spatio-temporal denoiser.

In an example, each of denoiser 510A, denoiser 510B, denoiser 510C, and denoiser 520A may be similar, and consist of a modified U-Net model which receive three frames as inputs. Any number of frames may be received at each denoiser, and three frames are discussed herein as an example. As shown in FIG. 5, input frame 530 may be referred to as the central frame or reference frame. Input frame 530A is temporally precedent to input frame 530. Input frame 530C is temporally precedent to input frame 530A. Input frame 530B is temporally subsequent to input frame 530. Input frame 530D is temporally subsequent to input frame 530B.

As shown in FIG. 5, the denoiser 510A receives input frame 530, input frame 530A, and input frame 530C and outputs a denoised frame to denoiser 520A. The denoiser 510B receives input frame 530, input frame 530A, and input frame 530B and outputs a denoised frame to denoiser 520A. Denoiser 510C receives input frame 530, input frame 530B, and input frame 530D and outputs a denoised frame to denoiser 520A. Each of the denoiser 510A, denoiser 510B, and denoiser 510C may share the same weights, which leads to a reduction of memory requirements of the model and facilitates the training of the network. A noise map (not shown) may also be included as input for each of the denoiser 510A, denoiser 510B, and denoiser 510C, which may allow for the processing of spatially varying noise. Contrary to typical denoising algorithms, each of denoiser 510A, denoiser 510B, and denoiser 510C receive no other parameters as inputs apart from the image sequence and the estimation of the input noise. Denoiser 520A receives the respective denoised frames from denoiser 510A, denoiser 510B, and denoiser 510C and outputs a frame 540.

Figure 6:
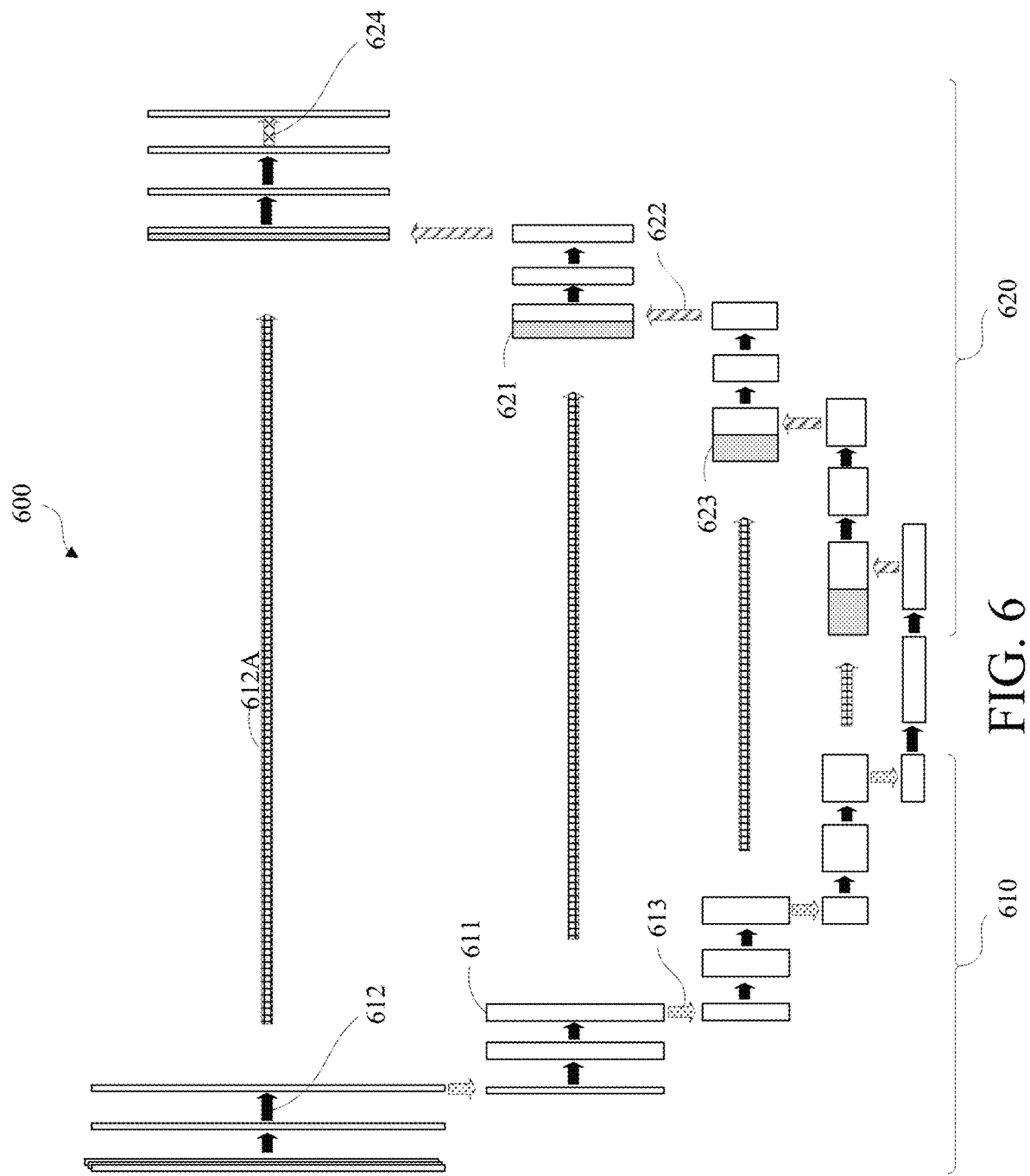
FIG. 6 is a block diagram of an example of a denoising block shown in FIG. 5.

FIG. 6 is a block diagram of an example of a denoiser 600. The denoiser 600 may be any of the denoiser 510A, denoiser 510B, denoiser 510C, and denoiser 520A shown in FIG. 5. The denoiser 600 may have a modified U-Net architecture. A U-Net architecture is a multi-scale encoder-decoder architecture, with skip-connections that forward the output of each one of the encoder layers 610 directly to the input of the corresponding decoder layers 620.

In this example, the encoder layers 610 may be supplemented by successive layers where pooling operators are replaced by upsampling operators. High resolution features from the encoder layers may be combined with the upsampled output to localize the data. A successive convolution layer may then learn to assemble a more precise output based on the localized data.

As shown in FIG. 6, each white box, for example box 611, corresponds to a multi-channel feature map. Each shaded box, for example box 621, corresponds to a copied feature map. Each hatched arrow, for example arrow 612A represents a copy and crop function. The solid arrows, for example arrow 612, represent a convolution followed by a rectified linear unit (ReLU). Any convolution may be used, for example, a 3×3 convolution. The stippled arrows, for example arrow 613, represent a max pooling operation for downsampling. Any max pooling operation may be used, for example, a 2×2 max pooling operation with stride 2. At each downsampling step, the number of feature channels may double. In dome embodiments, the max pooling operation may be replaced with a 3×3 convolutional layer with stride 2.

Every layer of the decoder layers 620 includes an upsampling of the feature map shown by a striped arrow, for example arrow 622. Each upsampling step is followed by a convolution. The convolution may be a 2×2 convolution that halves the number of feature channels. Each layer of the decoder layers 620 includes a concatenation with the correspondingly cropped feature map, for example box 623, from the encoder layers 610. Each layer of the decoder layers 620 includes two convolutions, each followed by a ReLU, as shown by the solid arrows. The convolutions may be 3×3 convolutions. Cropping may be needed due to the loss of border pixels in each convolution. At the final layer, a 1×1 convolution, shown as a cross-hatched arrow 624, may be used to map each component feature vector to the desired number of classes.

As shown in FIG. 6, the denoiser 600 includes some differences with respect to a typical U-Net. For example, the encoder layers 610 are adapted to receive three frames and a noise map as inputs. The upsampling in the decoder layers 620 may be performed in conjunction with a PixelShuffle layer to reduce gridding artifacts. The merging of the features of the encoder layers 610 with those of the decoder layers 620 may be performed using a pixel-wise addition operation instead of a channel-wise concatenation to reduce memory requirements. The denoiser 600 may implement residual learning, for example, with a residual connection between the central noisy input frame and the output frame to ease the training process.

The design characteristics of the denoiser 600 make a good compromise between performance and fast running times. For example, the denoiser 600 may include D=16 convolutional layers. The outputs of the convolutional layers may be followed by pointwise ReLU activation functions ReLU(•)=max(•,0), except for the last layer. The batch normalization layer may be placed between the convolutional layer and the ReLU activation layer during training. At evaluation time, the batch normalization layer may be removed and replaced with an affine layer that applies a learned normalization.

An example training dataset may include input-output pairs $P_t^j = \{(S_t^j, M^j), I_t^j\}_{j=0}^{m_t}$, where $S_t^j = (\tilde{I}_{t-2}^j, \tilde{I}_{t-1}^j, \tilde{I}_t^j, \tilde{I}_{t+1}^j, \tilde{I}_{t+2}^j)$ is a collection of 2T+1=5 spatial patches cropped at the same location in contiguous frames, and $I^j$ is the clean central patch of the sequence. The spatial patches are generated by adding AWGN of $\sigma \in [0, 55]$ to clean patches of a sequence, and the corresponding noise map $M^j$ may be built constant with all its elements equal to $\sigma$. Patches may be randomly cropped from randomly sampled sequences of the training dataset. The patches may be aligned.

In an example, a total of $m_t$=256000 training samples are extracted from the training set of the DAVIS database. The size of the patches should be larger than the receptive field of the denoising blocks. The spatial size of the patches is 96×96, while the temporal size is 2T+1=5. The loss function may be $$\mathcal{L}(\theta) = \frac{1}{2m_t} \sum_{j=1}^{m_t} \left\| \hat{I}_t^j - I_t^j \right\|^2, \quad (2)$$

where $\hat{I}_t^j = \mathcal{F}((S_t^j, M^j); \theta)$ is the output of the network, and $\theta$ is the set of all learnable parameters.

An adaptive moment estimation (ADAM) algorithm may applied to minimize the loss function, with all its hyperparameters set to their default values. The number of epochs is set to 80, and the mini-batch size may be 64. The scheduling of the learning rate may be common to both cases. It starts at 1e-3 for the first 50 epochs, then changes to 1e-4 for the following 10 epochs, and finally switches to 1e-6 for the remaining of the training. Data may be augmented by introducing rescaling by different scale factors and random flips. During the first 60 epochs, the orthogonalization of the convolutional kernels may be applied as a means of regularization. Initializing the training with orthogonalization may be beneficial to performance.

FIG. 7 is a flow diagram of an example of a convolutional neural network video denoising method 700. The method 700 may be performed with any number of frames, and is discussed with five frames as an example. The five frames include a central frame, an input frame temporally precedent to the central frame, a second input frame that is temporally precedent to the input frame, a third input frame that is temporally subsequent to the central frame, and a fourth input frame that is temporally subsequent to the third input frame.

Referring to FIG. 7, the method 700 includes obtaining 710A a plurality of frames of a video at a first denoiser. The plurality of frames obtained at operation 710A may include the central frame, the input frame temporally precedent to the central frame, and the second input frame temporally precedent to the input frame. The method 700 includes obtaining 710B a plurality of frames of a video at a second denoiser. The plurality of frames obtained at operation 710B may include the central frame, the input frame temporally precedent to the central frame, and the third input frame temporally subsequent to the central frame. The method 700 includes obtaining 710C a plurality of frames of a video at a third denoiser. The plurality of frames obtained at operation 710C may include the central frame, the third input frame temporally subsequent to the central frame, and the fourth input frame temporally subsequent to the third input frame.

The method 700 includes outputting 720A a first denoised frame by the first denoiser, outputting 720B a second denoised frame by the second denoiser, and outputting 720C a third denoised frame by the third denoiser. The method 700 includes obtaining and denoising 730 the first denoised frame, the second denoised frame, and the third denoised frame at a fourth denoiser. In this example, the denoising operations may implement a convolutional neural network-based architecture in accordance with embodiments of this disclosure and include spatial-temporal denoising of the three frames obtained at each of the four denoisers, as shown in FIGS. 5 and 6. The method 700 includes outputting 740 a denoised frame. The denoised frame may be based on the first denoised frame, the second denoised frame, and the third denoised frame.

A densely annotated video segmentation (DAVIS)-test testset and a Set8 testset were used to benchmark the method 700. The DAVIS-test testset contains 30 color sequences of resolution 854×480. The Set8 testset is composed of 4 color sequences from the Derfs Test Media collection and 4 color sequences captured with an image capture device. The sequences of the Set8 testset were downscaled to a resolution of 960×540. In all cases, the sequences were limited to a maximum of 85 frames. The DeepFlow algorithm was used to compute flow maps for the method 500 and video non-local Bayesian denoising (VNLB).

The method 700 output sequences featured remarkable temporal coherence. Flickering was minimal, especially in flat areas, where patch-based algorithms typically leave behind low-frequency residual noise. Table 1 shows a comparison of PSNR on the Set8 dataset. The values shown are the average for all sequences in the testset. The peak signal-to-noise ratio (PSNR) is computed as the average of the PSNRs of each frame.

TABLE 1

|               | Method 700 | DVDnet | VNLB  | V-BM4D | NV    |
|---------------|------------|--------|-------|--------|-------|
| $\sigma = 10$ | 36.30      | 36.08  | 37.26 | 36.05  | 35.67 |
| $\sigma = 30$ | 30.73      | 31.79  | 31.74 | 30.00  | 28.84 |
| $\sigma = 50$ | 28.31      | 29.56  | 29.24 | 27.33  | 25.46 |

As shown in Table 1, VNLB performs better for smaller values of noise. However, for larger values of noise, the method 500 surpasses VNLB. In effect, DVDnet tends to over denoise in some of these cases. However, for larger values of noise, DVDnet surpasses VNLB. The performance of method 700 is between DVDnet and VNLB, however the running times are orders of magnitude faster as shown in Table 2.

TABLE 2

| | Method | | | | |
|---|---|---|---|---|---|
|          | V-BM4D | VNLB | DVDnet (GPU) | VNLnet (GPU) | Method 700 |
|----------|--------|------|--------------|--------------|------------|
| Time (s) | 156    | 420  | 8            | 2.6          | 0.1        |

As shown in Table 2 above, the method 700 takes only 100 ms to denoise a 960×540 color frame, which is more than 3 orders of magnitude faster than V-BM4D and VNLB, and more than an order of magnitude of other CNN algorithms which run on GPU, DVDnet and VNLnet. The algorithms were tested on a multi-core server with a Titan Xp NVIDIA GPU card.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for denoising a video comprising multiple frames, the method comprising:
    obtaining, at a first denoiser, a central frame, an input frame that is temporally precedent to the central frame, and a second input frame that is temporally precedent to the input frame;
    obtaining, at a second denoiser, the central frame, the input frame, and a third input frame that is temporally subsequent to the central frame;
    obtaining, at a third denoiser, the central frame, the third input frame, and a fourth input frame that is temporally subsequent to the third input frame;
    obtaining, at a fourth denoiser, a first denoised frame from the first denoiser, a second denoised frame from the second denoiser, and a third denoised frame from the third denoiser, wherein each denoiser is configured to receive a noise map corresponding to the respective frames and to perform denoising using a multi-scale encoder-decoder architecture;
    denoising the first denoised frame, the second denoised frame, and the third denoised frame; and
    outputting a fourth denoised frame based on the first denoised frame, the second denoised frame, and the third denoised frame.

2. The method of claim 1, wherein the input frame and the third input frame are adjacent to the central frame.

3. The method of claim 1, wherein the second input frame is adjacent to the input frame and the fourth input frame is adjacent to the third input frame.

4. The method of claim 1, wherein the multi-scale encoder-decoder architecture comprises an encoder having a plurality of convolutional layers with downsampling operations and a decoder having a plurality of convolutional layers with upsampling operations.

5. The method of claim 1, wherein the denoising includes applying a convolutional layer, an activation layer, and a normalization layer.

6. The method of claim 5, wherein the activation layer is a pointwise rectified linear unit (ReLU) activation layer.

7. The method of claim 6, wherein the normalization layer is a batch normalization layer that is placed between the convolutional layer and the pointwise ReLU activation layer during training.

8. The method of claim 6, wherein the normalization layer is an affine layer that applies a learned normalization.

9. An image capture device comprising:
an image sensor configured to capture a central frame, an input frame that is temporally precedent to the central frame, a second input frame that is temporally precedent to the input frame, a third input frame that is temporally subsequent to the central frame, and a fourth input frame that is temporally subsequent to the third input frame;
a first denoiser configured to denoise the central frame, the input frame, and the second input frame and output a first denoised frame;
a second denoiser configured to denoise the central frame, the input frame, and the third input frame and output a second denoised frame;
a third denoiser configured to denoise the central frame, the third input frame, and the fourth input frame and output a third denoised frame; and
a fourth denoiser configured to denoise the first denoised frame, the second denoised frame, and the third denoised frame and output a fourth denoised frame, wherein each denoiser is configured to receive a noise map corresponding to the respective frames and to denoise the respective frames using a multi-scale encoder-decoder architecture.

10. The image capture device of claim 9, wherein the first denoiser, the second denoiser, the third denoiser, and the fourth denoiser are each further configured to denoise the respective frames without motion compensation.

11. The image capture device of claim 9, wherein each denoiser comprises a residual connection between a central noisy input frame and an output frame.

12. The image capture device of claim 11, wherein the multi-scale architecture includes a plurality of skip-connections that forward an output of an encoder layer directly to an input of a corresponding decoder layer.

13. The image capture device of claim 9, wherein the first denoiser, the second denoiser, the third denoiser, and the fourth denoiser each comprise a convolutional layer, an activation layer, and a normalization layer.

14. The image capture device of claim 13, wherein the activation layer is a pointwise rectified linear unit (ReLU) activation layer.

15. The image capture device of claim 14, wherein the normalization layer is a batch normalization layer that is placed between the convolutional layer and the pointwise ReLU activation layer during training.

16. The image capture device of claim 14, wherein the normalization layer is an affine layer.

17. An image capture device comprising:
an image sensor configured to:
capture a first plurality of frames comprising a central frame, an input frame that is temporally precedent to the central frame, and a second input frame that is temporally precedent to the input frame,
capture a second plurality of frames comprising the central frame, the input frame, and a third input frame that is temporally subsequent to the central frame, and
capture a third plurality of frames comprising the central frame, the third input frame, and a fourth input frame that is temporally subsequent to the third input frame; and
a processor comprising:
a first denoising layer, the first denoising layer comprising:
a first denoiser configured to denoise the first plurality of frames and output a first denoised frame,
a second denoiser configured to denoise the second plurality of frames and output a second denoised frame, and
a third denoiser configured to denoise the third plurality of frames and output a third denoised frame; and
a second denoising layer comprising a fourth denoiser configured to output a denoised frame based on the first denoised frame, the second denoised frame, and the third denoised frame, wherein each denoiser is configured to receive a noise map corresponding to the respective frames and to denoise the respective frames using a multi-scale encoder-decoder architecture.

18. The image capture device of claim 17, wherein the input frame and the third input frame are adjacent to the central frame.

19. The image capture device of claim 17, wherein the second input frame is adjacent to the input frame and the fourth input frame is adjacent to the third input frame.

20. The image capture device of claim 17, wherein the multi-scale encoder-decoder architecture comprises skip-connections that forward outputs of encoder layers directly to corresponding decoder layers.

* * * * *